United States Patent [19]

Pileggi

[11] Patent Number: 5,511,811
[45] Date of Patent: *Apr. 30, 1996

[54] AIR DAMPING FOR BICYCLE SHOCK ABSORBING FORK

[75] Inventor: James D. Pileggi, Beaverton, Oreg.

[73] Assignee: Halson Designs, Inc., Wilsonville, Oreg.

[*] Notice: The term of this patent shall not extend beyond the expiration date of Pat. No. 5,417,446.

[21] Appl. No.: 427,123

[22] Filed: Apr. 24, 1995

Related U.S. Application Data

[62] Division of Ser. No. 303,071, Sep. 8, 1994, Pat. No. 5,417,446.

[51] Int. Cl.⁶ ............................................. B62K 2508
[52] U.S. Cl. ........................ 280/276; 188/299; 267/34; 267/64.26; 267/64.28; 267/217; 267/219
[58] Field of Search ........................... 280/276; 188/299; 267/34, 64.26, 64.28, 217, 219

[56] References Cited

U.S. PATENT DOCUMENTS 5,195,766 3/1993 Dohrmann et al. ................. 280/276
5,417,446 5/1995 Pileggi ............................... 280/276

Primary Examiner—Mitchell J. Hill
Attorney, Agent, or Firm—Robert L. Harrington

[57] ABSTRACT

A shock absorbing fork for a bicycle having an air damping feature to rapidly and effectively diminish the cyclical motion of the struts of the fork resulting from the compression and expansion of the resilient shock absorbing pads provided in the struts of the fork when an obstacle is encounter by the front wheel of the bicycle. The struts have an inner cylinder slidably mounted in an outer cylinder with the pads captively mounted between the bottom of the inner cylinder and a member of the outer cylinder. An air chamber within the outer cylinder is contracted by movement of the inner cylinder into the outer cylinder and is expanded by movement of the inner cylinder out of the outer cylinder. The pads, as the inner cylinder is moved into the outer cylinder are compressed to absorb the shock and the air in the chamber is compressed. The compressibility of the air allows the fork to immediately respond to the impact force. In addition, the controlled exhaust of the compressed air to the atmosphere reduces the amount of impact energy that would otherwise be stored by the spring. The reduction in stored impact energy in turn reduces the cyclical rebound of the fork enabling it to reach equilibrium more quickly.

1 Claim, 2 Drawing Sheets

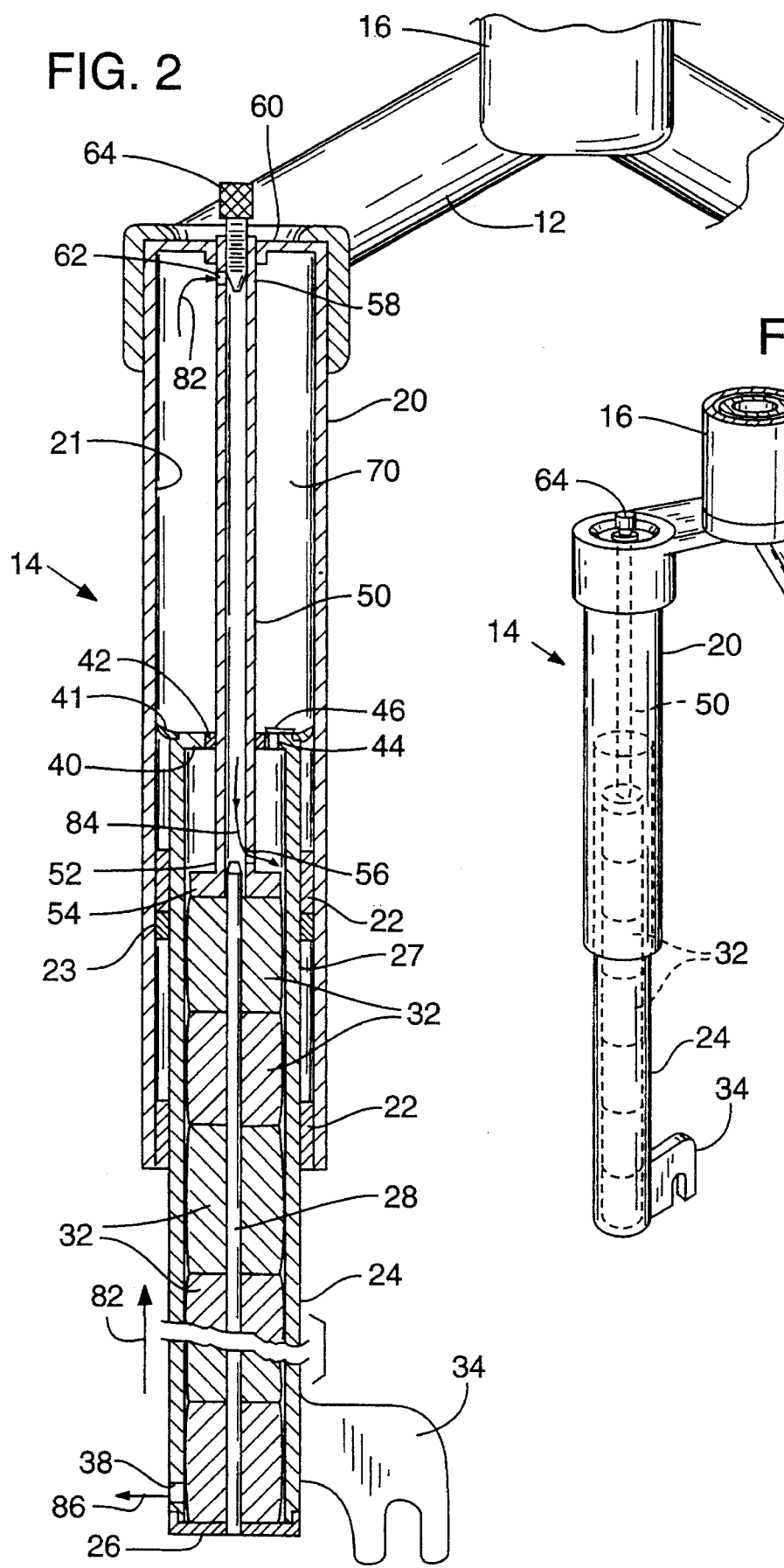

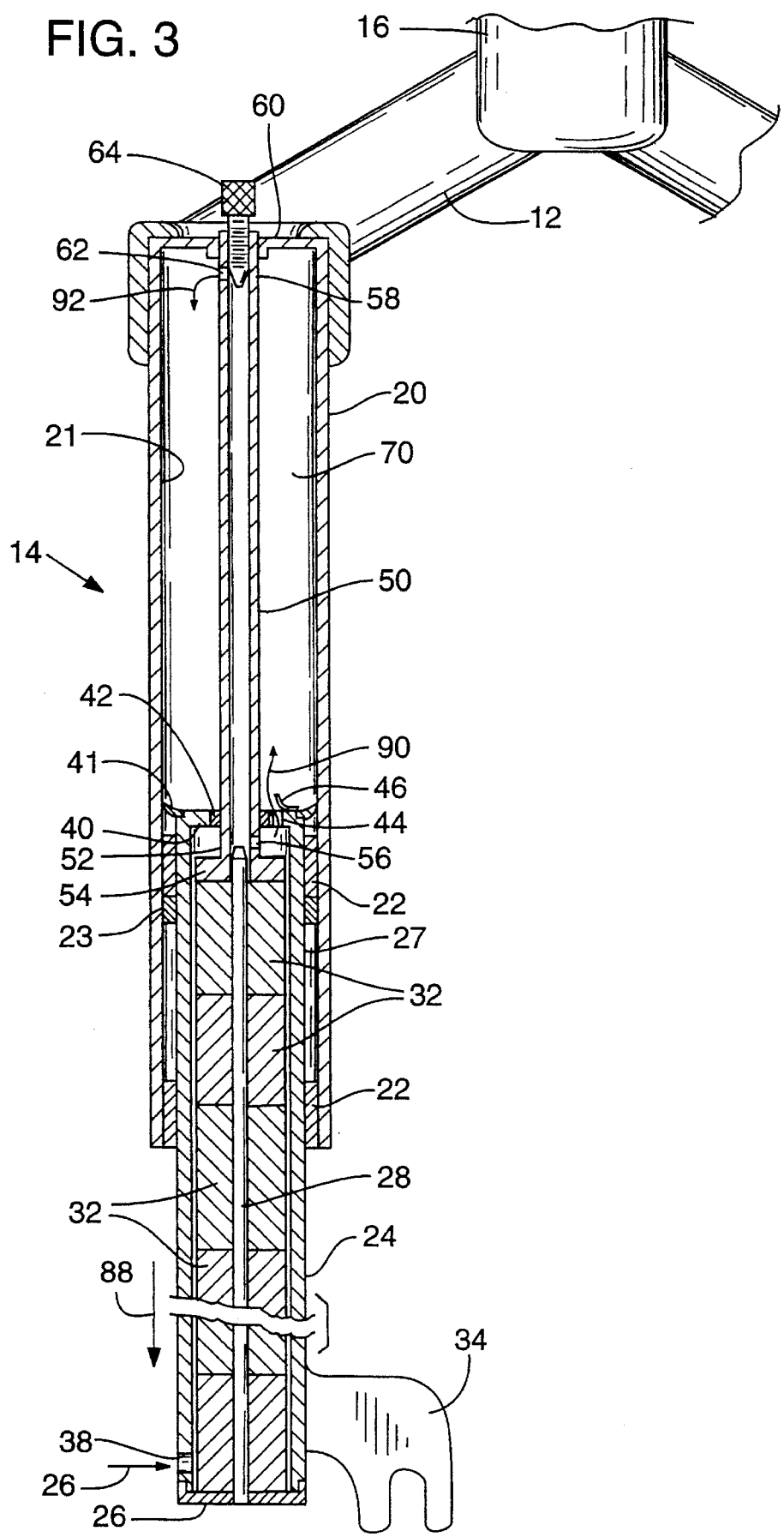

AIR DAMPING FOR BICYCLE SHOCK ABSORBING FORK

This is a division of application Ser. No. 08/303,071 filed on Oct. 08, 1994, now U.S. Pat. No. 5,417,446.

FIELD OF THE INVENTION

This invention relates to shock absorbers for bicycles and more particularly to an air damping feature of such shock absorbers.

BACKGROUND OF THE INVENTION

Bicycle shock absorbers are designed to soften the effect of bumps and holes in the roadway as impacted on the rider. The shock absorption feature is typically provided in the bicycle's front wheel steering fork. When the front wheel falls into a hole or hits a bump, the wheel is jarred or jolted and (without the shock absorbers) the shock effect is transferred through the front wheel support and steering mechanism (the steering fork) directly to the rider, i.e., to his arms particularly when he is leaning forward as in racing, but also to the rider's torso supported on the pedals and seat of the bicycle. Shock absorption for the fork is provided by having collapsible struts that collapse against an elastic member, e.g., a spring member Thus the shock is "absorbed" by the elastic member and the jarring action is converted to a softer bouncing-like action.

Whereas this bouncing-like action is far easier on the rider than the jarring effect without =he shock absorbers, there is the problem of setting in motion a repetitive cycling of the bouncing action as the elastic member compresses and expands in seeking its equilibrium. The repetitive bouncing is not desirable and, thus, shock absorbers of the type herein contemplated are provided with a damping feature. A damping feature functions in concert with the elastic member by permitting but resisting the compression and expansion cycles and more rapidly causes the elastic member to find the equilibrium position.

Typically dampers for shock absorbers have been provided using liquid, (e.g., oil) that is sealed inside the fork and through design is moved back and forth between two chambers through a restricted portal as the elastic member is compressed and expanded. The portal allows liquid flow therethrough but resists rapid movement of the liquid. The effect is that the initial jarring action produces sufficient force on the liquid to rapidly (but less rapidly than without the restriction) transfer the liquid to the other chamber. Then as the elastic member tries to rebound or expand, that movement is also resisted by requiring reverse flow of the liquid through the portal. The result is that repetitive bouncing is retarded.

The problems associated with liquid (oil) dampers is that total sealing is difficult to maintain and, thus, leaking frequently occurs, and the oil gets hot and less viscous when in constant activity and this affects resistance and retardation of the bouncing. Further, air weighs less than liquid and even small weight reduction is considered important for bicycles.

BRIEF SUMMARY OF THE INVENTION

The present invention uses air as the damping media. Previously air damping was not considered feasible due to the compressibility of air. However, by using a plunger that has a relatively large cross section so that a larger quantity of air is moved with a relatively short stroke, and when applied for control of a relatively small force e.g., the bouncing weight of a person riding a bicycle (perhaps 150 pounds of applied weight) as compared to the weight of a vehicle, air has been found to be a very effective damper. Furthermore, the present invention uses the atmosphere as its "other" chamber. Leaking is not a problem and the air is constantly cooled through exhaust and intake to and from the atmosphere. Also it is believed that the compressibility of the air may even provide an advantage. Whereas the initial impact is solidly resisted by a liquid damper due to its mass and incompressibility, the air gives (compresses) as flow through an orifice commences. This initial give of the air damping system is considered to be desirable as it lowers the initial impact transfer to the rider.

The structure of the preferred embodiment consists of skewered pads that provide the shock absorbing feature (similar to the skewered pads of the commonly assigned U.S. Pat. No. 5,269,549). The skewered pads are accessible from the bottom of the strut rather than the top as illustrated in the '549 patent. The inner cylinder of the strut which is the bottom portion of the strut, is attached to the front wheel axle and has an upper end that functions as a plunger or piston inside the outer cylinder. The distance between the "plunger" (upper end) of the inner cylinder and the top wall of the outer cylinder defines a collapsible air chamber.

A fixed small diameter hollow push rod (tube) extends from the top of the outer cylinder down through the chamber and through an opening in the plunger (upper end) of the inner cylinder. A seal is provided between the push rod and the opening in the upper end of the inner cylinder to prevent air from leaking out of the chamber and into the inner cylinder around the push rod. The push rod has a bottom flange that abuts the pads. Thus, as the inner cylinder slides upwardly inside the outer cylinder, the pads are compressed between the flange of the push rod and bottom of the inner cylinder. At the same time the chamber length is shortened with the air compressed in the chamber by the plunger of the inner cylinder sliding up inside the outer cylinder. An orifice in push rod at the top thereof and inside the chamber permits restrictive movement of air out of the chamber down through the rod and into the inner cylinder where a second orifice allows the air to flow into the inner cylinder down through the inner cylinder a bottom vent exposed to the atmosphere.

A valve screw projects from the top of the outer cylinder down into the push rod and overlaps the orifice and, thus, varies the opening as the screw is adjusted inwardly and outwardly relative to the top.

The above structure and its advantages will be more fully appreciated upon reference to the following detailed description and accompanying drawings.

BRIEF DESCRIPTION OF THE DRAWINGS

FIG. 1 is a view of a bicycle shock absorbing fork of the present invention;

FIG. 2 is a sectional view of one of the struts of the shock absorbing fork of FIG. 1, and;

FIG. 3 is a sectional view similar to FIG. 2 of one of the struts of the shock absorbing fork of the present invention.

DESCRIPTION OF THE PREFERRED EMBODIMENT

Refer now to FIG. 1 of the drawings which illustrates a bicycle steering fork of the present invention. The fork of the present invention is a shock absorbing fork utilizing elastomeric bumpers 32 (pads) to absorb the shock encountered as an individual rides the bicycle over rough terrain. The fork incorporates air damping to rapidly diminish the reciprocating motion of the struts of the fork that occur when the front wheel of the bicycle encounters a bump or a chuck hole or the like.

The fork has a crown (triple clamp) 12 from which struts 14 extend to an axle of a front wheel of a bicycle. A steering tube 16 also extends from the crown 12 and is rotatably mounted in a steering head of the bicycle in a conventional manner to mount the fork to the bicycle. Handle bars are attached to the extended end of the steering tube to facilitate steering the front wheel.

Referring to FIGS. 1 and 3, the struts 14 in this embodiment have a large outer cylinder (tube) 20 attached to and extending from the crown 12 of the fork. A smaller diameter inner cylinder (tube) 24 is slidably mounted in bushings 22 in the large cylinder 20. A seal 23 is provided adjacent the upper bushing 22 as shown to seal the small cylinder 24 to the large cylinder 20 and thus prevent air flow through the upper bushing 22 and thus between the inner wall 21 of the large cylinder 20 and the outer wall 27 of the small cylinder 24. The smaller cylinder 24 is of sufficient length to extend out of the large cylinder 20 even when the small cylinder 24 is fully retracted into the large cylinder 20. A removable cap 26, having a rod 28 attached, is removably mounted to the end 30 of the small cylinder 24. Bumper pads 32, having a central through bore, are mounted on the rod 28. The cap 26 is removable to facilitate inserting, removing or interchanging the resilient cylindrical like bumpers (pads) 32. The rod 28 aligns the bumpers 32 centrally within the lower cylinder 24. A bracket 34 is fixedly attached at the lower end 30 of the cylinder 24 and is arranged to receive an axle end of a wheel of the bicycle. A vent hole 38 is provided at the lower end 30 of the cylinder 24 for the free entry and escapement of air.

As shown, the lower cylinder 24 is slidably mounted in the upper cylinder 20. The inner cylinder 24 has an upper end (top) 40 with a resilient piston Cup 41 mounted thereon. The cup 41 is circular and engages the inner cylindrical wall 21 of the outer cylinder 20. The cup 41 maximizes the surface area of the end 40 of the inner cylinder 24. The space within the outer cylinder 20 between the upper end 60 of the outer cylinder and the cup 41 of the inner cylinder 24 defines a chamber 70 that is expanded as the inner cylinder 24 moves outwardly (downwardly as shown in FIG. 3) relative to the outer cylinder 20 and is contracted as the inner cylinder 24 moves inwardly (upwardly as shown in FIG. 2) relative to the outer cylinder 20. The end 40 and the cup 41 have a central bore that receives a hollow push rod 50. An end 58 of the hollow push rod 50 is fixedly mounted to the upper end 60 of the large cylinder 20 and as shown, the hollow push rod 50 is of sufficient length to extend into the inner cylinder 24. A seal 42 is provided to prevent the flow of air as between the upper end 40 of the cylinder 24 and the push rod 50. An orifice (vent) 44, such as a through bore, is provided in the upper end 40 and the cup 41 of the cylinder 24 and a one way flow control valve 46 is provided strategic to the orifice 44 to permit the flow of air through the orifice 44 in a single direction. The control valve 46 permits air to flow through the orifice 44 only when the air pressure in the chamber 70 is less than the air pressure in the inner cylinder 24 which occurs when the lower cylinder 24 is moving outwardly (FIG. 3) from the cylinder 20.

A ring like flange 54 is fixedly attached to the lower end 52 of the hollow rod 50. An orifice 56 (vent) is provided in the side of the hollow rod 50 near the mounting of the flange 54 on end 52 of the hollow rod 50. The orifice 56 permits the flow of air into and out of the hollow center of the hollow rod 50. The hollow push rod 50, as previously mentioned, is fixedly attached to the end 60 of the large cylinder 20 in a conventional manner such as by threadably connecting an externally threaded end 58 of the hollow rod 50 to a threaded bore of the end 60. An aperture (vent hole), also referred to as an orifice 62 is provided near end 58 of the hollow rod 50 to permit the flow of air into the hollow interior of the push rod 50. A valve stem 64 is threadably and adjustably inserted into the threaded interior of the end 58. The valve stem 64 is adjustable to cover (close) off the aperture 62 either partially or fully by adjusting the position of the valve stem 64 in relation to the aperture 62. The valve stem 64 will thus control the flow rate of air through the aperture 62 by adjusting the position of the valve stem 64 in relation to the aperture 62.

Operation:

The fork 10 of the present invention not only has shock absorbing capability but has air damping to rapidly slow the repetitive bouncing motion that is set into place when the front wheel of the bicycle encounters an obstacle such as a bump, chuck hole or the like. The resilient bumpers 32 are yieldably compressible to absorb the shock of the front wheel traversing an obstacle. As the front wheel goes over an obstacle, such as a bump in the travel path, the wheel being forced upward will apply a force on the lower cylinder 24 to urge the lower cylinder to move upward into the large cylinder 20 as shown in FIG. 2, i.e., the cylinders are collapsed together. The small lower cylinder 24 being forced into the large upper cylinder 20 will in the process compress the bumpers 32. The bumpers 32 are confined in the lower cylinder 24 between the cap or second abutment 26 and the flange or first abutment 54 of the push rod 50. The push rod 50 is fixedly mounted to the large cylinder 20 and therefore as the small cylinder 24 is forced upward into the large cylinder 20, the bumpers 32 are compressed between the flange 54 of the push rod 50 and the lower cap 26 of the inner cylinder 24. The compression of the bumpers 32, since they are resilient, sets up a reactive force to urge the lower cylinder 24 to move outwardly out of the outer cylinder 20.

The inner cylinder 24 as it moves into the large cylinder 20 will decrease the size of the chamber 70 (the cup 41 moves toward end 60) and thus applies pressure on the air contained therein. The cup 41 mounted on the top 40 of the inner cylinder 24 acts as a plunger (piston) to urge compression of the air. The only escape route for the air within the chamber 70 is through the orifice 62 (indicated by arrow 82) since the inner cylinder 24 and outer cylinder 20 are sealed from leakage at the adjoining walls by the cup 41 in addition to seal 23, and from leakage around the push rod 50 and the top 40 by seal 42. The vent 44 in the cup 41 of the inner cylinder 24 is closed by the one way flow control valve 46. The rate at which the air may flow through the orifice 62 is controlled by adjusting the position of the valve stem 64 relative to the orifice 62. The air will flow at a controlled rate through the orifice 62 down the center of the hollow push rod 50 and out through the vent 56 (indicated by arrow 84) of the push rod 50 (which is within the lower cylinder 24) and into the lower cylinder 24. The air will flow out of the lower cylinder 24 via the vent 38 (indicated by arrow 86 in FIG. 2).

The air is believed to be somewhat beneficially compressed in the chamber 70 by the instantaneous initial movement of the inner cylinder 24 into the outer cylinder 20 urged when the front wheel strikes a rock or the like.

Consider that the air chamber 70 is initially filled with a non compressible liquid and the orifice 62 is closed. The cylinder 24 would be prevented from movement and there would not be any absorption of shock. Even with the orifice 62 open, the resistance to instant rapid movement of the cylinder 24 by the liquid due to its mass and incompressibility results in a substantial shock being transmitted to the rider. With air as the damper media the resistance is not totally dictated by flow of the media through the orifice 62 as the air will compress and thereby permit the compression of the bumper pads 32 and soften the initial impact.

The air nevertheless passes quickly through the orifice 62 and the return stroke as urged by the compressed bumpers is again resisted by the air chamber which urges air to be drawn into the chamber. The inner cylinder 24 will be moved outwardly (as indicated by arrow 88 in FIG. 3) when the biasing forces of the compressed bumper pads 32 are sufficient to overcome the force that urges the inner cylinder 24 inward. The biasing force of the pads urging the inner cylinder 24 outward will thus be decreased due to the need to replace the air within the chamber 70. This air damping or reduction in the biasing force urging the inner cylinder 24 outward will thus reduce the distance the cylinder 24 will move outwardly. The stored energy of the compressed pads 32 will however tend to move the inner cylinder 24 outward beyond its null point and the cycle will be repeated, that is the inner cylinder 24 will be urged to move inwardly, but at a lesser force, to once again compress the pads 32. The cycle will be repeated but with a reduced or without the effect of the air being compressed.

In the return stroke just described, air will also flow into the chamber 70 through the one way control valve 46 (as indicated by arrow 90 in FIG. 3). This lessens the resistance of the return stroke urged by the compressed pads so that the primary damping activity occurs in the collapsing portion of the cycle. This is considered desirable but may not be considered essential, i.e., where maximum damping is desired for both the collapsing and expansion portions of the cycle.

Those skilled in the art will recognize that modifications and variations may be made without departing from the true spirit and scope of the invention. One modification contemplated is the elimination of the vent to the atmosphere. This could be achieved with sufficient air volume within the cylinders to prevent undesired heating of the air. The invention is therefore not to be limited to the embodiments described and illustrated, but is to be determined from the appended claims.

I claim:

1. A shock absorbing system for bicycles having a frame and front and rear wheels supporting the frame, said system comprising:

a shock absorbing damper between the frame and one of the front and rear wheels;

said damper comprised of a plunger and an outer cylinder with the plunger slidably received in the outer cylinder;

said plunger and outer cylinder relatively slidable between a contracted position and an extended position;

said plunger and outer cylinder cooperatively defining an air chamber that contracts and expands as the plunger and cylinder slide relatively between the contracted and extended positions respectively, said air chamber having an air passage allowing air leakage into and out of said air chamber, said air passage providing restricted and controlled release of air into and out of said air chamber to dampen rapid relative sliding of the plunger and outer cylinder.

* * * * *